United States Patent [19]
Downs

[11] Patent Number: 5,484,535
[45] Date of Patent: Jan. 16, 1996

[54] SEAWATER EFFLUENT TREATMENT DOWNSTREAM OF SEAWATER $SO_2$ SCRUBBER

[75] Inventor: William Downs, Washington Township, Ohio

[73] Assignee: The Babcock & Wilcox Company, New Orleans, La.

[21] Appl. No.: 246,024

[22] Filed: May 19, 1994

[51] Int. Cl.⁶ .................................. C02F 1/66; C02F 1/72
[52] U.S. Cl. .......................... 210/724; 210/747; 210/749; 210/758
[58] Field of Search .................................. 210/724, 747, 210/749, 758

[56]  References Cited

U.S. PATENT DOCUMENTS

| | | | |
|---|---|---|---|
| 775,525 | 11/1904 | Doughty | 210/724 |
| 1,685,300 | 9/1928 | Travers | 210/724 |
| 1,714,828 | 5/1929 | Travers . | |
| 1,765,424 | 6/1930 | Hageman et al. | 210/724 |
| 2,707,171 | 4/1955 | Miller | 210/747 |
| 3,262,865 | 7/1966 | Waters, Jr. | 210/724 |
| 5,298,173 | 3/1994 | Burke | 210/747 |

FOREIGN PATENT DOCUMENTS

| | | | |
|---|---|---|---|
| 6361 | 1/1976 | Japan | 210/724 |
| 10389 | 1/1984 | Japan | 210/724 |

*Primary Examiner*—Neil McCarthy
*Attorney, Agent, or Firm*—Robert J. Edwards; Eric Marich

[57]  ABSTRACT

A method for treating effluent seawater used in a process for desulfurizing flue gas includes aerating the effluent seawater in an aeration pond. The aerated effluent seawater is then channeled through a bed of crushed limestone for raising the pH of the seawater to at least 7.8. The seawater is then channeled back to the fresh seawater source, such as an ocean, without causing any harm to the environment. Fresh limestone is periodically added to the bed and the size of the bed is varied depending on the amount of effluent seawater to be treated.

12 Claims, 3 Drawing Sheets

SEAWATER EFFLUENT TREATMENT DOWNSTREAM OF SEAWATER SO₂ SCRUBBER

FIELD AND BACKGROUND OF THE INVENTION

The present invention relates, in general, to the desulfurization of flue gas and, in particular, to a new and useful method for treating seawater after scrubbing the flue gas with seawater.

It is well-known that seawater can be used to scrub $SO_2$ amounts from boiler flue gases. This is known as "seawater scrubbing". The active constituent in the seawater is bicarbonate. Seawater has a natural pH of about 8.2. During the scrubbing process the following reactions take place:

(1)

(2)

The major constituents in fresh seawater include:
19,000 ppm chloride ion
10,600 ppm sodium ion
1300 ppm magnesium ion
890 sulfate ion
400 ppm calcium ion
380 ppm potassium ion
170 ppm bicarbonate ion In addition, the seawater tends to be saturated with oxygen at about 5 ppm.

When seawater leaves the scrubber, the chemical composition has been altered by the scrubbing process. A portion of the bicarbonate is depleted by reaction (1). The sulfate concentration is slightly elevated over its background concentration, and essentially all of the dissolved oxygen is consumed by reaction (2) above. The portion of the bisulfite that is not oxidized by reaction (2) remains in the seawater as a chemical oxygen demand (COD) constituent. Finally, the pH of the seawater leaving the scrubber can be as low as 3.5. Because of these changes, the seawater cannot be returned to the ocean without first treating the water to an extent where the water will not adversely effect aquatic life.

Presently, there is no known method or system for treating effluent seawater from a seawater scrubber system which provides an efficient treatment of the seawater prior to returning to its natural source.

SUMMARY OF THE INVENTION

The present invention pertains to the treating of effluent seawater produced by the desulfurization of flue gas. The method according to the present invention comprises aerating the effluent seawater in an aeration pond. The aerated effluent seawater is then channeled through a bed of crushed limestone in order to raise the pH of the seawater to at least 7.8. The seawater is then channeled back to a fresh seawater source, such as the ocean, without causing any harmful side effects to the environment or aquatic life.

Fresh limestone is periodically added to the bed; and the size of the bed, which includes the height, width and length of the bed, is varied depending on the effluent seawater to be treated.

It is an object of the present invention to provide a method for treating effluent seawater which utilizes less amounts of fresh seawater than used by the known treatment systems and methods.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
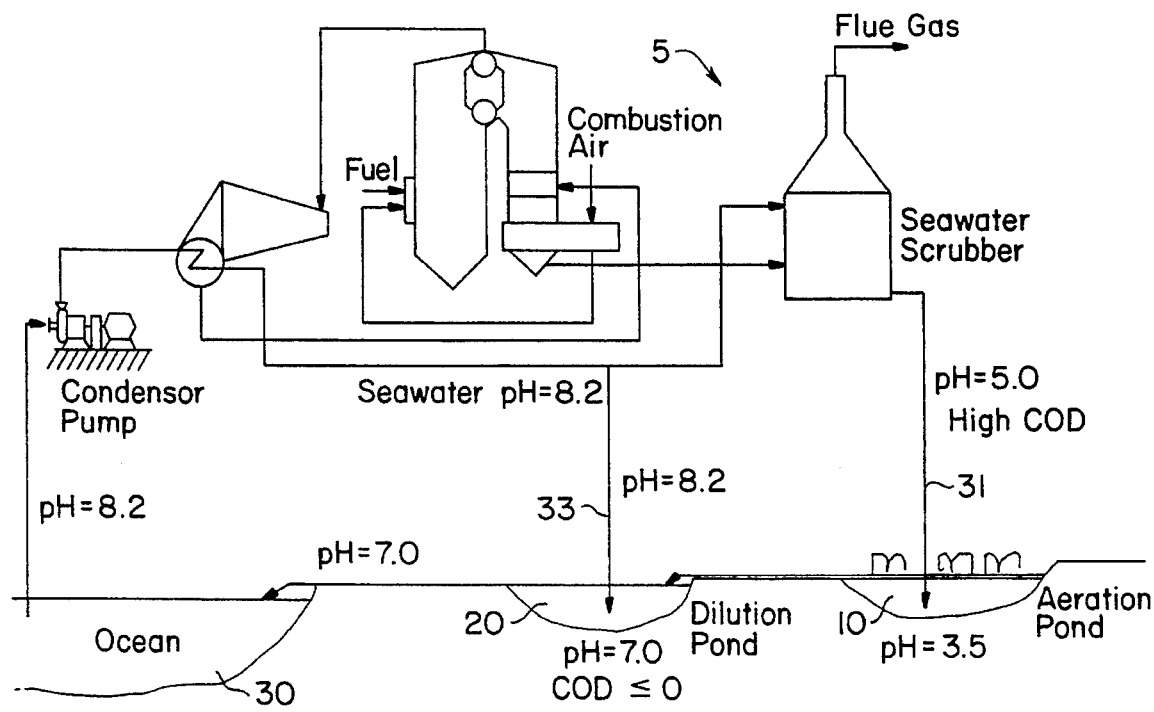
FIG. 1 is a schematic view illustrating a known method for treating effluent seawater.

The conventional method for treating spent seawater 31 from an $SO_2$ scrubber system, generally designated 5, utilizes fresh seawater 33 derived from a seawater source 30 such as the ocean and is a two-step process illustrated schematically in FIG. 1. The first step is to send the spent seawater 31 to an aeration pond 10. In the pond 10, the water 31 is aerated to complete reaction (2), mentioned above, and to resaturate the water with oxygen. As this proceeds, the pH will continue to drop, sometimes to as low as about 3.5.

The second step of the conventional seawater scrubber effluent treatment process is to pass the aerated seawater to a second pond or dilution pond 20 where the treated seawater is mixed with fresh seawater 33. The purpose is to raise the pH of the mixture to an acceptable compromise pH. Typically, the pH must be raised to at least 7.0. Some locations require that the seawater effluent pH be raised to at least 7.8. The higher the pH, the greater the quantity of fresh seawater required for dilution and mixing.

Although the process of mixing these two seawater streams 31 and 33 is simple, the pumping costs can be excessive. An 800 MWe boiler burning 2% sulfur fuel and utilizing a seawater scrubber can easily produce 750,000 gallons per minute of seawater effluent which must be mixed with about 1,000,000 gallons of fresh seawater. These are extremely large quantities of seawater which must be accounted for. In fact, the amount of waste water treatment is about three orders of magnitude greater than the waste water produced by limestone flue gas desulfurization (FGD) systems. Thus, for the energy required to pump these quantities of water, it takes about 1.7 MW to lift 750,000 gpm of seawater through an elevation change of only 10 feet.

Figure 2:
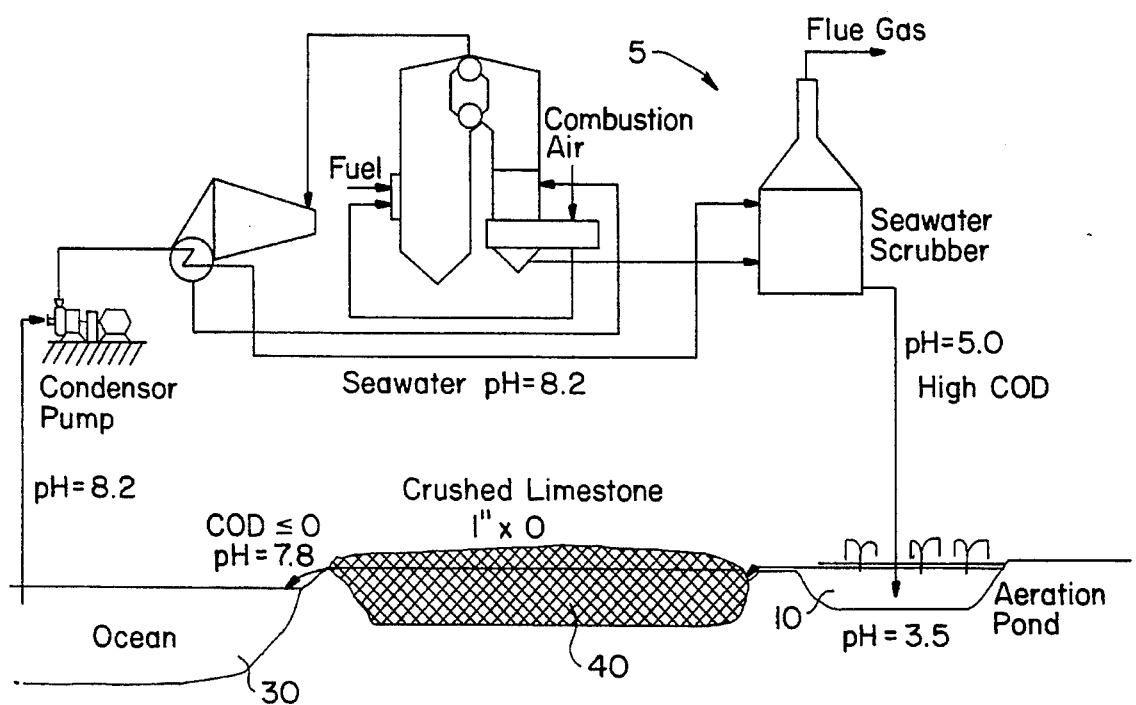
FIG. 2 is a schematic view illustrating a method for treating effluent seawater according to the present invention.

The present invention is schematically illustrated in FIG. 2. The same reference numerals of FIG. 1 are used to designate the same or similar features of the present invention. The present invention replaces the mixing pond 20 (FIG. 1) with a "percolating channel" filled with limestone gravel indicated as reference numeral 40. Similar to the known method mentioned above, the effluent seawater 31 is channeled to aeration pond 10 for being aerated. After aeration, the pH of the seawater 31 should have a pH approximately 3.5. However, after aeration, the seawater 31 is channeled to the limestone particle bed 40. As the aerated, acidic seawater passes through the granular bed of limestone

40, the following reaction neutralizes the acidity and replenishes the bicarbonate:

$$CaCO_3(s) + H^+ \rightarrow HCO_3^- + Ca^{++} \quad (3)$$

Figure 3:
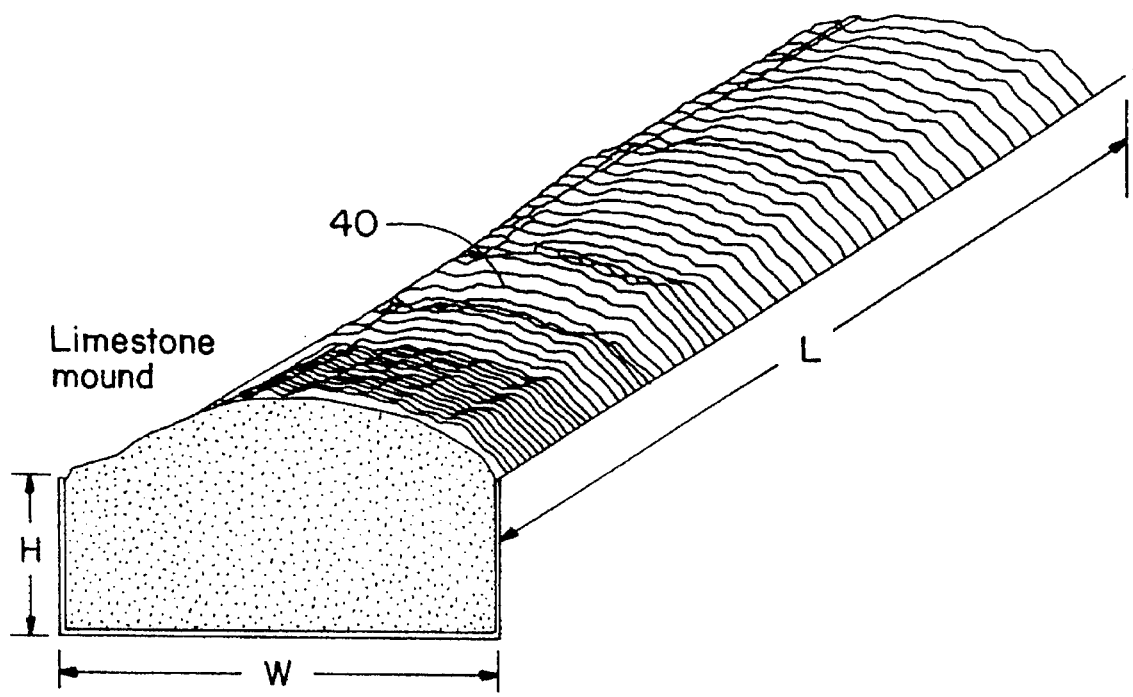
FIG. 3 is a schematic view illustrating a limestone bed of FIG. 2.

For an 800 MWe boiler burning 2% sulfur coal, and having an effluent rate of 750,000 gpm, the channel 40 can be sized to have a depth or height H of 10 feet, a width W of 30 feet, and a length L of 1000 feet as shown in FIG. 3. According to the present invention, the height H, width W and length L of the channel 40 can comprise various dimensions in order to suit the size of the effluent seawater treatment operation. The channel 40 is filled with 1"×0 limestone granules so that it is overflowing, as illustrated in FIG. 3. As long as limestone bed 40 is large enough, the pH of the seawater 31 channeled through bed 40, is raised to at least 7.8.

For the above-mentioned example, it would be necessary to "top off" the mound of limestone approximately every 10 days to two weeks. Top off periods will vary depending on the size of channel 40 and the extent of treatment needed. The concentrations of reactants and reaction products in this system are such that no precipitation will take place in the channel 40. Therefore, pluggage of the granular material in the channel 40 is not a problem.

After channeling the seawater 31 through bed 40, the seawater is channeled back to the natural seawater source 30.

For low sulfur seawater scrubbing applications, the channel size can be reduced in proportion to the sulfur concentration or the time periods between topping off periods can be extended proportionally.

The present invention has several advantages which are listed below.

The present invention reduces seawater pumping costs significantly. In the 800 MW seawater power plant scrubber example, the pumping power can be reduced by as much as 10 MWe.

Also, the present invention actually replenishes the alkalinity of the seawater. The current practice of adjusting the pH by mixing the effluent with fresh seawater does not. In fact, the conventional method depletes bicarbonate from the seawater.

Moreover, if the limestone gravel channel 40 is sufficiently large enough, equilibrium is established between the seawater and the limestone and the pH is ≧7.8. This brings the seawater much closer to the natural pH of seawater. The conventional method cannot achieve the pH range without resorting to nearly infinite dilution.

Additionally, the known methods of pH control fit the axiom "the solution to pollution is dilution". By contrast, the present invention is a proactive approach.

While specific embodiments of the invention have been shown and described in detail to illustrate the application of the principles of the invention, it will be understood that the invention may be embodied otherwise without departing from such principles.

I claim:

1. A method for treating effluent seawater produced by a flue gas desulfurization process utilizing seawater, the method comprising:

aerating the effluent seawater in an aeration pond;

channeling the aerated effluent seawater from said aeration pond through a limestone bed percolating channel having a height, a width and a length, and an upper surface exposed to the atmosphere, and then channeling said aerated effluent seawater to a natural seawater source.

2. The method according to claim 1, including periodically adding an amount of fresh limestone to the limestone bed.

3. The method according to claim 1, including raising the pH of the effluent seawater to at least 7.8.

4. The method according to claim 1, including raising the pH of the effluent seawater to at least 7.8 prior to channeling to the natural seawater source.

5. The method according to claim 2, including periodically adding an amount of fresh limestone to the limestone bed in which the fresh limestone is in a granular form.

6. The method according to claim 1, including varying the height, the width and the length of the limestone bed proportionally to the amount of effluent seawater.

7. The method according to claim 2, including varying the time period for adding an amount of fresh limestone proportionally to the amount of effluent seawater.

8. The method according to claim 1, including periodically adding an amount of fresh limestone to the limestone bed.

9. The method according to claim 8, including varying the height, the width and the length of the limestone bed proportionally to the amount of effluent seawater.

10. The method according to claim 9, including varying the time period for adding an amount of fresh limestone proportionally to the amount of effluent seawater.

11. The method according to claim 10, including raising the pH of the effluent seawater to at least 7.8.

12. The method according to claim 11, including channeling the effluent seawater from the limestone bed to a natural seawater source.

\* \* \* \* \*